United States Patent
Grundvig et al.

(10) Patent No.: US 8,174,784 B2
(45) Date of Patent: May 8, 2012

(54) SYSTEMS AND METHODS FOR INTER-LOCATION CONTROL OF STORAGE ACCESS

(75) Inventors: Jeffrey P. Grundvig, Loveland, CO (US); Richard Rauschmayer, Longmont, CO (US); Timothy T. Ding, Saratoga, CA (US)

(73) Assignee: Agere Systems Inc., Allentown, PA (US)

( * ) Notice: Subject to any disclaimer, the term of this patent is extended or adjusted under 35 U.S.C. 154(b) by 53 days.

(21) Appl. No.: 12/527,311

(22) PCT Filed: Oct. 30, 2007

(86) PCT No.: PCT/US2007/082981
§ 371 (c)(1),
(2), (4) Date: Aug. 14, 2009

(87) PCT Pub. No.: WO2009/058130
PCT Pub. Date: May 7, 2009

(65) Prior Publication Data
US 2010/0208377 A1    Aug. 19, 2010

(51) Int. Cl.
*G11B 5/09*    (2006.01)
*G11B 5/596*    (2006.01)

(52) U.S. Cl. ........................ 360/51; 360/77.08
(58) Field of Classification Search .................. None
See application file for complete search history.

(56) References Cited

U.S. PATENT DOCUMENTS

| | | |
|---|---|---|
| 3,973,182 A | 8/1976 | Kataoka |
| 3,973,183 A | 8/1976 | Kataoka |
| 4,024,571 A | 5/1977 | Dischert et al. |
| 4,777,544 A | 10/1988 | Brown et al. |
| 5,130,866 A | 7/1992 | Klaassen et al. |
| 5,237,325 A | 8/1993 | Klein et al. |
| 5,278,703 A | 1/1994 | Rub et al. |
| 5,309,357 A | 5/1994 | Stark et al. |
| 5,341,249 A | 8/1994 | Abbott et al. |
| 5,377,058 A | 12/1994 | Good et al. |
| 5,521,948 A | 5/1996 | Takeuchi |
| 5,523,902 A | 6/1996 | Pederson |
| 5,668,679 A | 9/1997 | Swearingen et al. |
| 5,696,639 A | 12/1997 | Spurbeck et al. |
| 5,706,265 A | 1/1998 | Bang |
| 5,781,129 A | 7/1998 | Schwartz et al. |
| 5,798,885 A | 8/1998 | Saiki et al. |
| 5,825,568 A | 10/1998 | Lee |
| 5,835,295 A | 11/1998 | Behrens |
| 5,844,920 A | 12/1998 | Zook et al. |

(Continued)

OTHER PUBLICATIONS

Annampedu, V. and Aziz, P.M., "Adaptive Algorithms for Asynchronous Detection of Coded Servo Signals Based on Interpolation", IEEE Trans. on Mag., vol. 41, No. 10, Oct 2005.

(Continued)

*Primary Examiner* — Daniell L Negron
(74) *Attorney, Agent, or Firm* — Hamilton, DeSanctis & Cha

(57) ABSTRACT

Various embodiments of the present invention provide systems and methods for controlling access to a magnetic storage medium. As one example, a method for controlling access to a magnetic storage medium is disclosed that includes providing a location count indicating a location between a portion of a first servo data sector of a magnetic storage media and a portion of a second servo data sector of the magnetic storage media, and asserting an enable window signal based upon the location count.

20 Claims, 6 Drawing Sheets

U.S. PATENT DOCUMENTS

| | | | |
|---|---|---|---|
| 5,852,524 A | 12/1998 | Glover et al. | |
| 5,986,830 A | 11/1999 | Hein | |
| 5,987,562 A | 11/1999 | Glover | |
| 6,009,549 A | 12/1999 | Bliss et al. | |
| 6,023,383 A | 2/2000 | Glover et al. | |
| 6,069,583 A | 5/2000 | Silverstrin et al. | |
| 6,081,397 A * | 6/2000 | Belser | 360/51 |
| 6,111,712 A | 8/2000 | Vishakhadatta et al. | |
| 6,208,478 B1 | 3/2001 | Chiu et al. | |
| 6,278,591 B1 | 8/2001 | Chang et al. | |
| 6,400,518 B1 | 6/2002 | Bhaumik et al. | |
| 6,404,829 B1 | 6/2002 | Sonu | |
| 6,441,661 B1 | 8/2002 | Aoki et al. | |
| 6,490,110 B2 | 12/2002 | Reed et al. | |
| 6,493,162 B1 | 12/2002 | Fredrickson | |
| 6,519,102 B1 | 2/2003 | Smith et al. | |
| 6,530,060 B1 | 3/2003 | Vis et al. | |
| 6,603,622 B1 | 8/2003 | Christiansen et al. | |
| 6,606,048 B1 | 8/2003 | Sutardja | |
| 6,646,822 B1 | 11/2003 | Tuttle et al. | |
| 6,657,802 B1 | 12/2003 | Ashley et al. | |
| 6,775,529 B1 | 8/2004 | Roo | |
| 6,788,484 B2 | 9/2004 | Honma | |
| 6,813,108 B2 | 11/2004 | Annampedu et al. | |
| 6,816,328 B2 | 11/2004 | Rae | |
| 6,839,014 B2 | 1/2005 | Uda | |
| 6,856,183 B2 | 2/2005 | Annampedu | |
| 6,876,511 B2 | 4/2005 | Koyanagi | |
| 6,912,099 B2 | 6/2005 | Annampedu et al. | |
| 6,920,004 B1 | 7/2005 | Codilian et al. | |
| 6,963,521 B2 | 11/2005 | Hayashi | |
| 6,999,257 B2 | 2/2006 | Takeo | |
| 6,999,264 B2 | 2/2006 | Ehrlich | |
| 7,002,767 B2 | 2/2006 | Annampedu et al. | |
| 7,038,875 B2 | 5/2006 | Lou et al. | |
| 7,072,137 B2 | 7/2006 | Chiba | |
| 7,082,005 B2 | 7/2006 | Annampedu et al. | |
| 7,092,462 B2 | 8/2006 | Annampedu et al. | |
| 7,116,504 B1 | 10/2006 | Oberg | |
| 7,126,776 B1 | 10/2006 | Warren, Jr. et al. | |
| 7,136,250 B1 | 11/2006 | Wu et al. | |
| 7,154,689 B1 | 12/2006 | Shepherd et al. | |
| 7,167,328 B2 | 1/2007 | Annampedu et al. | |
| 7,180,693 B2 | 2/2007 | Annampedu et al. | |
| 7,187,739 B2 | 3/2007 | Ma | |
| 7,191,382 B2 | 3/2007 | James et al. | |
| 7,193,544 B1 | 3/2007 | Fitelson et al. | |
| 7,193,798 B2 | 3/2007 | Byrd et al. | |
| 7,199,961 B1 | 4/2007 | Wu et al. | |
| 7,203,013 B1 | 4/2007 | Han et al. | |
| 7,206,146 B2 | 4/2007 | Flynn et al. | |
| 7,230,789 B1 | 6/2007 | Brunnett et al. | |
| 7,253,984 B1 | 8/2007 | Patapoutian et al. | |
| 7,301,717 B1 | 11/2007 | Lee et al. | |
| 7,308,057 B1 | 12/2007 | Patapoutian | |
| 7,362,536 B1 | 4/2008 | Liu et al. | |
| 7,375,918 B1 | 5/2008 | Shepherd et al. | |
| 7,411,531 B2 | 8/2008 | Aziz et al. | |
| 7,420,498 B2 | 9/2008 | Barrenscheen | |
| 7,423,827 B2 | 9/2008 | Neville et al. | |
| 7,446,690 B2 | 11/2008 | Kao | |
| 7,499,238 B2 | 3/2009 | Annampedu | |
| 7,620,101 B1 | 11/2009 | Jenkins | |
| 2002/0001151 A1 | 1/2002 | Lake | |
| 2002/0150179 A1 | 10/2002 | Leis et al. | |
| 2002/0176185 A1 | 11/2002 | Fayeulle et al. | |
| 2002/0181377 A1 | 12/2002 | Nagata et al. | |
| 2003/0095350 A1 | 5/2003 | Annampedu et al. | |
| 2005/0046982 A1 | 3/2005 | Liu et al. | |
| 2005/0157415 A1 | 7/2005 | Chiang | |
| 2005/0243455 A1 | 11/2005 | Annampedu | |
| 2007/0071152 A1 | 3/2007 | Chen et al. | |
| 2007/0104300 A1 | 5/2007 | Esumi et al. | |
| 2007/0183073 A1 | 8/2007 | Sutardja et al. | |
| 2007/0230015 A1 | 10/2007 | Yamashita | |
| 2007/0263311 A1 | 11/2007 | Smith | |
| 2008/0080082 A1 | 4/2008 | Erden et al. | |
| 2008/0212715 A1 | 9/2008 | Chang | |
| 2008/0266693 A1 | 10/2008 | Bliss et al. | |
| 2009/0002862 A1 | 1/2009 | Park et al. | |
| 2009/0142620 A1 | 6/2009 | Yamamoto et al. | |

OTHER PUBLICATIONS

.Aziz and Annampedu, "Asynchronous Maximum Likelihood (ML) Detection of Servo repeatable Run Out (RRO) Data".

Aziz & Annampedu, "Interpolation Based Maximum-Likelihood(ML) Detection of Asynchronous Servo Repeatable Run Out (RRO) Data", IEEE Int. Mag. Con., vol. 42, No. 10, Oct 2006.

* cited by examiner

SYSTEMS AND METHODS FOR INTER-LOCATION CONTROL OF STORAGE ACCESS

BACKGROUND OF THE INVENTION

The present invention is related to systems and methods for accessing a magnetic storage medium, and more particularly to systems and methods for controlling access to a magnetic storage medium.

A read channel integrated circuit (IC) is one of the core electronic components in a magnetic recording system such as a hard disk drive. A read channel converts and encodes data to enable magnetic read heads to write data to the disk drive and then read the data accurately. The disks in a drive typically have many tracks on them. Each track typically consists of user data sectors, as well as control or "servo" data sectors interspersed between the user data sectors. The servo data sectors help to position the magnetic recording head on a track so that the information stored in the read sectors is retrieved properly. In addition, various marks are interspersed in the user data and may be relied upon as feedback for a phase lock loop used to control a clock sampling the data. At times, however, noise is introduced in the channel that causes a failure in the identification of one or more elements included in a particular servo data sector or in the marks interspersed in the user data. Because of this, data may be lost or improperly interpreted during a read operation.

Hence, for at least the aforementioned reasons, there exists a need in the art for advanced systems and methods for accessing a magnetic storage medium.

BRIEF SUMMARY OF THE INVENTION

The present invention is related to systems and methods for accessing a magnetic storage medium, and more particularly to systems and methods for controlling access to a magnetic storage medium.

Some embodiments of the present invention provide methods for controlling access to a magnetic storage medium. Such methods include providing a location count indicating a location between a portion of a first servo data sector of a magnetic storage media and a portion of a second servo data sector of the magnetic storage media. In some cases, the portion of the first servo data sector is a SAM (Servo Address Mark), and the portion of the second servo data sector is a subsequent SAM. The methods further include asserting an enable window signal based upon the location count. In some instances of the aforementioned embodiments, the location count is provided by incrementing a SAM2SAM counter between consecutive SAMs. In some instances of the aforementioned embodiments, the enable window circuit is further operable to deassert the enable window output based on an input that is not generated based on the count value.

In some instances of the aforementioned embodiments, the enable window signal is asserted during a period when a SAM is expected. In particular instances, circuitry used to detect a SAM may be switched to a low power mode when the enable window signal is not asserted. In other instances of the aforementioned embodiments, the enable window signal is asserted during a period when a mark is expected within a user data portion between the first servo data sector and the second servo data sector. In some such instances, the enable window signal may be asserted and deasserted multiple times between the first servo data sector and the second servo data sector. In yet other instances of the aforementioned embodiments, the enable window signal is asserted during a period when a preamble is expected. In particular instances of the aforementioned embodiments, the enable window signal is asserted at a point sufficiently prior to a disk drive event to allow for preparation for the disk drive event. Such a disk drive event may be, but is not limited to, a servo event, a write event or a read event. In one or more instances of the aforementioned embodiments, the enable window signal may be deasserted or reset at a point unrelated to the location count.

Other embodiments of the present invention provide systems for data access. Such systems include a magnetic storage medium with at least a first servo data sector and a second servo data sector, a location counter that is operable to provide a count value indicating a location between the first servo data sector and the second servo data sector, and an enable window circuit that is operable to assert an enable window output based on the count value. In particular instances of the aforementioned embodiments, the location counter is a SAM2SAM counter.

In various instances of the aforementioned systems, the systems further include a SAM detection module that is operable to identify a SAM within the second servo data sector. In such instances, the enable window output enables operation of the SAM detection module before the SAM is expected. Further, in such instances the enable window circuit includes a comparator that is operable to compare the count against an upper threshold and a lower threshold. The enable window output is asserted whenever the count is greater than to the lower threshold and not greater than the upper threshold.

In other instances of the aforementioned embodiments, the systems further include a mark detection module that is operable to identify a first mark and a second mark within a user data between the first servo data sector and the second servo data sector. In such instances, the enable window output enables operation of the mark detection module before the first mark is expected, disables the mark detection module after the first mark should have been detected, and enables the mark detection module before the second mark is expected. In yet other instances of the aforementioned embodiments, the system further include a preamble detection module that is operable to identify a preamble within the second servo data sector. In such instances, the enable window output enables operation of the preamble detection module before the preamble is expected.

Yet further embodiments of the present invention provide hard disk drives that include a magnetic storage medium and a disk controller that controls access to the magnetic storage medium. The magnetic storage medium includes at least a first servo data sector with a first SAM and a second servo data sector with a second SAM. The disk controller includes a SAM2SAM counter that is operable to provide a count value indicating a location between the first SAM and the second SAM, and an enable window circuit that is operable to assert an enable window output based on the count value. In some instances, the enable window circuit is operable to enable operation one or more of a SAM detection module operable to identify the second SAM within the second servo data sector, a preamble detection module operable to identify a preamble within the second servo data sector, and a mark detection module operable to identify at least a first mark and a second mark interspersed between the first SAM and the second SAM. In some cases, all of the SAM detection module, the preamble detection module and the mark detection module are included and share at least one circuit element.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present invention is related to systems and methods for accessing a magnetic storage medium, and more particularly to systems and methods for controlling access to a magnetic storage medium.

Figure 1A:
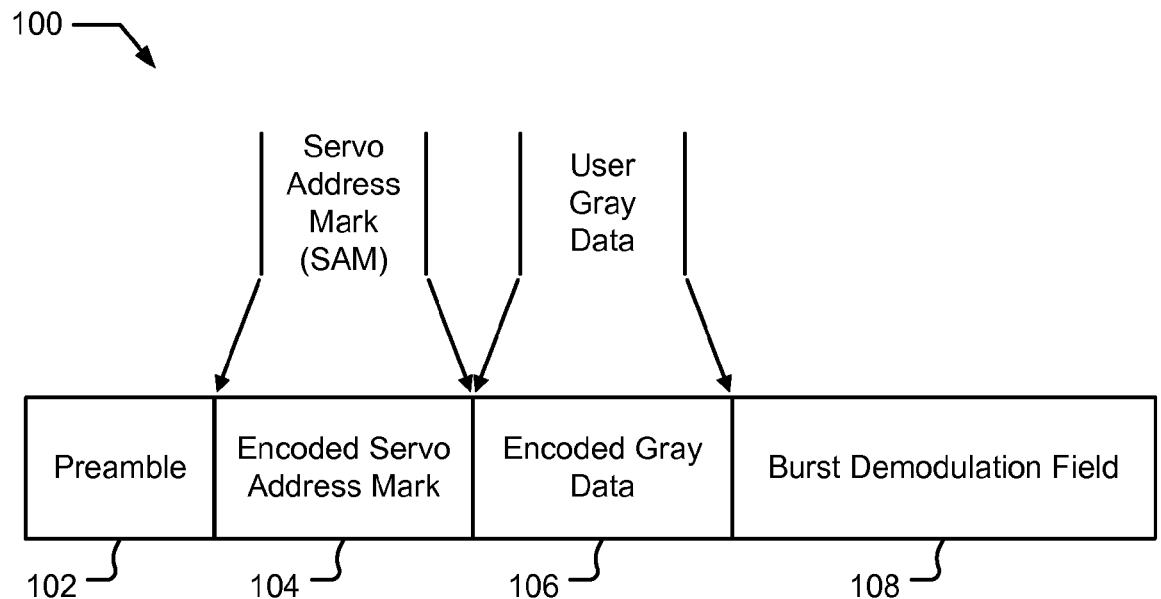
FIGS. 1a, 1b, 1c and 2 show prior art approaches to synchronization.
Figure 1B:
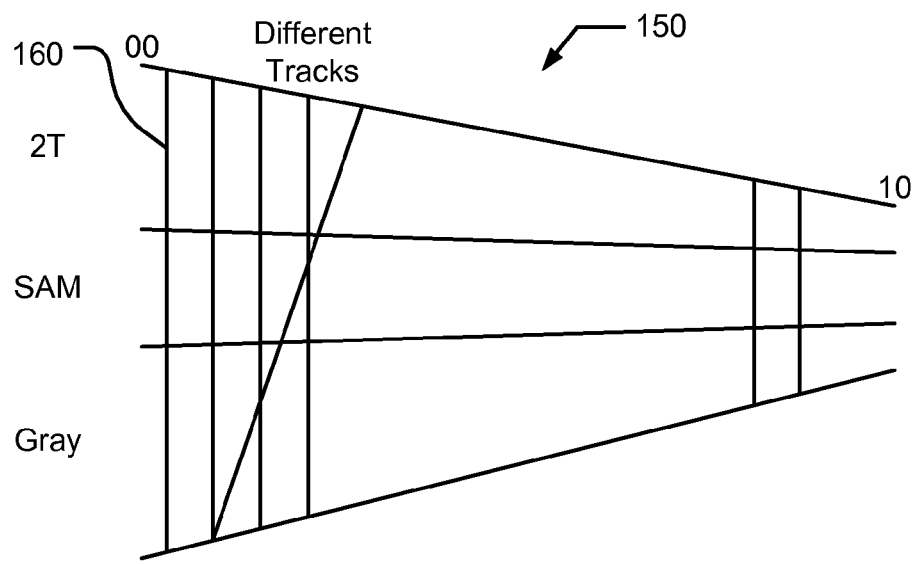

FIG. 1a depicts a prior art data format of a servo data sector 100. As shown, servo data sector 100 may include a preamble pattern 102 which allows the system to recover the timing and gain of the written servo data. Preamble pattern 102 is typically followed by a servo address mark (SAM) 104 which is the same for all servo sectors. SAM 104 is then followed by encoded servo Gray data 106, and Gray data 106 is followed by one or more burst demodulation fields 108. Gray data 106 may represent the track number/cylinder information and provides coarse positioning information for a read head traversing a magnetic storage medium. Burst demodulation field 108 provides fine positioning information for the read head traversing a magnetic storage medium. FIG. 1b shows the aforementioned servo data sector 100 incorporated as part of each of a number of tracks 160 that extend in a radial pattern around a magnetic storage medium 150. In an ideal case, a read head traverses an individual track over alternating servo data sectors and user data sectors.

Figure 1C:
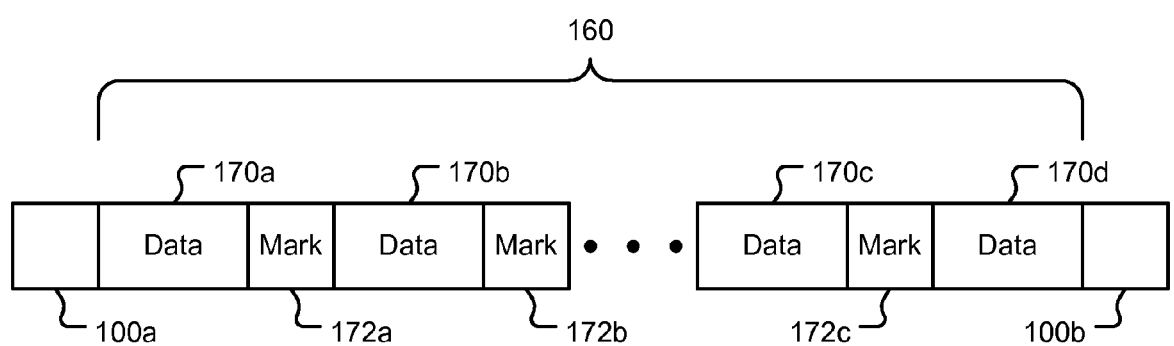

FIG. 1c depicts a user data region 160 extending between two consecutive servo data sectors 100. In particular, user data region 160 includes regions of data 170 separated by periodic data marks 172. Such data marks 172 typically include a data address mark and/or other information as are known in the art and may generically be referred to as marks. In various cases, there may be eight marks 172 interspersed in the user data between the two servo data sectors.

Figure 2:
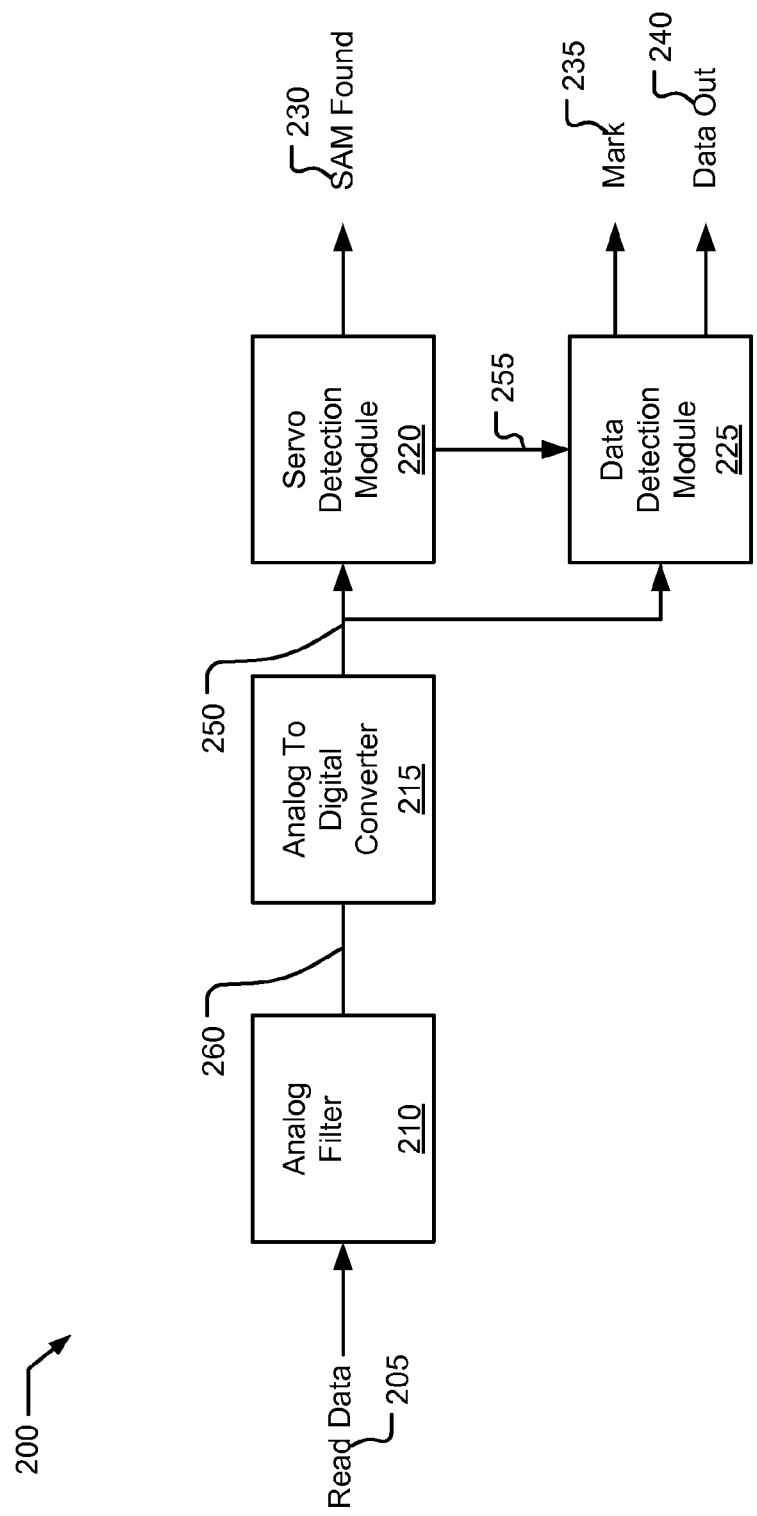

FIG. 2 depicts a prior art system 200 for receiving read data 205 from a magnetic storage medium. Read data 205 is provided to an analog filter 210, and a filtered analog output 260 is provided to an analog to digital converter 215. Analog to digital converter 215 provides a digital output 250 to both a servo detection module 220 and a data detection module 255. Servo detection module 220 is operable to synchronize a sample clock to read data 205 based in part on identifying a servo address mark within the servo data. Once the servo address mark is identified, a SAMFOUND 230 signal is asserted. Timing information 255 is provided from servo detection module 220 to synchronize user data retrieved from digital output 250 by a data detection module 225. Data detection module provides a mark output 235 indicating the location of marks interspersed within the user data, and a user data output 240. In some cases, system 200 may include a counter synchronous to the internal clock cycles that provides a count value as a read head is moved from one SAM to a subsequent SAM. This count information has historically been used to control the read channel internal clock frequency by forcing it to match and track the servo data sector spacing on a magnetic storage medium. In particular, where the number of clock periods required to traverse a user data region is known, a count value from one SAM to the next SAM can be used to indicate whether the internal clock is running too fast or too slow compared to the disk spin speed between consecutive servo data sectors. Using this information, an adjustment can made to correct the frequency of the internal clock.

Figure 3:
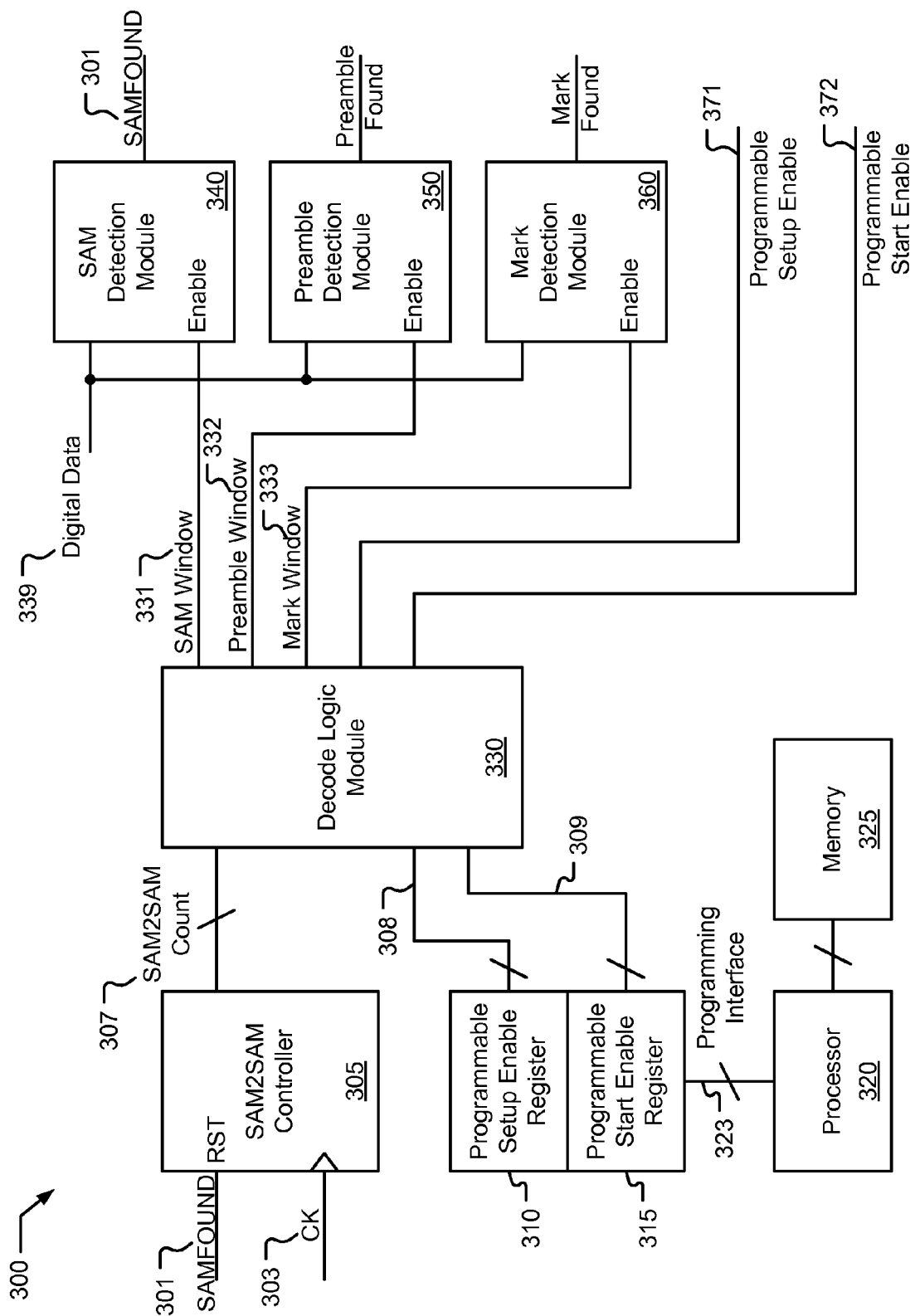
FIG. 3 is a system for providing enhanced synchronization processing in accordance with some embodiments of the present invention.

Turning to FIG. 3, a system 300 for providing enhanced synchronization processing in accordance with some embodiments of the present invention is depicted. System 300 includes a SAM2SAM counter 305 that is incremented each time a clock signal 303 is asserted, and is reset each time a SAMFOUND signal 301 is asserted. In one particular embodiment of the present invention, clock signal 303 operates at a data sampling frequency established as is known in the art through processing sector data and/or marks interspersed in user data. The output of SAM2SAM counter 305 is a SAM2SAM count value 307. In one particular embodiment of the present invention, SAM2SAM counter 305 is a sixteen bit counter synchronized to clock signal 303. Based on the disclosure provided herein, one of ordinary skill in the art will recognize a variety of counter circuits that may be used to implement SAM2SAM counter 305, and a variety of counter sizes that may be used depending upon the particular implementation.

SAM2SAM count value 307 is provided to a decode logic module 330. In addition, a set of programmable values are provided to decode logic module 330. In particular, an upper threshold and a lower threshold value for a setup enable 308 are provided from a programmable setup enable register 310, and an upper threshold and a lower threshold value for a start enable 309 are provided from a programmable setup enable register 315. Registers 310, 315 are programmed by a processor 320 via a programming interface 323. Processor 320 may be any processor known in the art, and programming interface 323 may be any interface known in the art that allows for writing one or more memory positions or registers by processor 320. Based on the disclosure provided herein, one of ordinary skill in the art will recognize a number of processors and processor interfaces that may be utilized in relation to different embodiments of the present invention.

Decode logic module 330 provides a variety of enable signals based at least in part on SAM2SAM count value 307. These enable signals represent windows in time when particular events are expected to occur in relation to processing information to/from a magnetic storage medium. In particular, decode logic module 330 provides a SAM window signal 331 that is asserted shortly before a subsequent SAM is expected within a subsequent servo data sector, and is maintained asserted until a short time after the SAM should have occurred. SAM window signal 331 is provided as an enable input to a SAM detection module 340 that is responsible for identifying a SAM within a servo data sector. SAM detection module 340 may be any SAM detection module known in the art that is capable of providing SAMFOUND signal 301, and which can be modified in accordance with different embodiments of the invention to accept an enable signal. By using SAM2SAM count value 307 to open windows during which SAM detection module 340 attempts to identify a subsequent SAM, more certainty can be achieved for avoiding potential false positives, and providing additional guidance to SAM detection in a noisy environment. Further, the circuitry associated with SAM detection may be disabled when the window is not open allowing for potential power savings. By using SAM2SAM count value 307 to predict the occurrence of a subsequent SAM, a very accurate window of consideration may be opened that would account for possible frequency variation of the disk spin speed from one servo data sector to the next. Such windowing may be particularly helpful during spiral waveform processing as the physical location of servo data sectors is variable, but the SAMs occur at known or otherwise predictable SAM2SAM counter intervals.

In one particular embodiment of the present invention, decode logic module 330 includes two SAM window comparators: one for comparing SAM2SAM count value 307 against a lower threshold (e.g., a particular SAM2SAM count value 307 when it would be desirable to start looking for a SAM) and another for comparing SAM2SAM count value 307 against an upper threshold (e.g., a particular SAM2SAM count value 307 when the SAM should have already been detected). When SAM2SAM count value 307 exceeds the lower threshold, SAM window signal 331 is asserted and continues asserted until SAM2SAM count value 307 exceeds the upper threshold thus creating the "window". In some embodiments of the present invention, the upper and lower thresholds may be programmable via a processor. In other cases, the upper and lower thresholds are hard coded. Based on the disclosure provided herein, one of ordinary skill in the art will recognize a variety of circuits that may be used to generate such a window based on the available SAM2SAM count.

Alternatively or in addition, decode logic module 330 provides a preamble window signal 332 that is asserted shortly before a subsequent preamble is expected within a subsequent servo data sector, and is maintained asserted until a short time after the preamble should have occurred. Preamble window signal 332 is provided as an enable input to a preamble detection module 350 that is responsible for identifying a preamble within a servo data sector. Preamble detection module 350 may be any preamble detection module known in the art which can be modified in accordance with different embodiments of the invention to accept an enable signal. For example, preamble detection module 350 may operate for spiral servo processing to calculate phase and other information. By using SAM2SAM count value 307 to open windows in which preamble detection module 350 attempts to identify a subsequent preamble, more certainty can be achieved for avoiding potential false positives, and providing additional guidance to preamble detection in a noisy environment. Further, the circuitry associated with preamble detection may be disabled when the window is not open allowing for potential power savings. By using SAM2SAM count value 307 to predict the occurrence of a subsequent preamble, a very accurate window of consideration may be opened that would account for possible frequency variation of the disk spin speed from one servo data sector to the next. Such windowing may be particularly helpful during spiral waveform processing as the physical location of servo data sectors is variable, but the preambles occur at known or otherwise predictable SAM2SAM counter intervals.

In one particular embodiment of the present invention, decode logic module 330 includes two preamble window comparators: one for comparing SAM2SAM count value 307 against a lower threshold (e.g., a particular SAM2SAM count value 307 when it would be desirable to start looking for a preamble) and another for comparing SAM2SAM count value 307 against an upper threshold (e.g., a particular SAM2SAM count value 307 when the preamble should have already been detected). When SAM2SAM count value 307 exceeds the lower threshold, preamble window signal 332 is asserted and continues asserted until SAM2SAM count value 307 exceeds the upper threshold thus creating the "window". In some embodiments of the present invention, the upper and lower thresholds may be programmable via a processor. In other cases, the upper and lower thresholds are hard coded. Based on the disclosure provided herein, one of ordinary skill in the art will recognize a variety of circuits that may be used to generate such a window based on the available SAM2SAM count.

Alternatively or in addition, decode logic module 330 provides a mark window signal 333 that is asserted shortly before a subsequent mark is expected within a user data segment, and is maintained asserted until a short time after the mark should have occurred. Mark window signal 333 is provided as an enable input to a mark detection module 360 that is responsible for identifying marks interspersed within user data. Such marks may include, but are not limited to, data address marks. Mark detection module 360 may be any mark detection module known in the art which can be modified in accordance with different embodiments of the invention to accept an enable signal. By using SAM2SAM count value 307 to open windows in which mark detection module 360 attempts to identify a subsequent mark, more certainty can be achieved for avoiding potential false positives, and providing additional guidance to mark detection in a noisy environment. Further, the circuitry associated with mark detection may be disabled when the window is not open allowing for potential power savings. By using SAM2SAM count value 307 to predict the occurrence of a subsequent mark, a very accurate window of consideration may be opened that would account for possible frequency variation of the disk spin speed from one servo data sector to the next. Such windowing may be particularly helpful since read rates and user data wedge sizes may vary across a magnetic storage medium from zone to zone. However, as all of the variance is known ahead of time, predicting a subsequent mark location based on the SAM2SAM count is possible.

In one particular embodiment of the present invention, decode logic module 330 includes two mark window comparators: one for comparing SAM2SAM count value 307 against a lower threshold (e.g., a particular SAM2SAM count value 307 when it would be desirable to start looking for a mark) and another for comparing SAM2SAM count value 307 against an upper threshold (e.g., a particular SAM2SAM count value 307 when the mark should have already been detected). When SAM2SAM count value 307 exceeds the lower threshold, mark window signal 333 is asserted and continues asserted until SAM2SAM count value 307 exceeds the upper threshold thus creating the "window". When the upper threshold is exceeded, the lower threshold and the upper threshold are increased to reflect the location of the next expected mark, and the process of comparing the thresholds and asserting and deasserting the mark signal window is repeated. Once SAMFOUND 301 is asserted, the upper and lower thresholds are reset to indicate the expected location of a first mark within the user data. In some embodiments of the present invention, the upper and lower thresholds may be programmable via a processor. In other cases, the upper and lower thresholds are hard coded. Based on the disclosure provided herein, one of ordinary skill in the art will recognize a variety of circuits that may be used to generate such a window based on the available SAM2SAM count.

Alternatively or in addition, decode logic module 330 provides a programmable setup enable signal 371 that is asserted shortly before a setup time for a particular function. For example, programmable setup enable signal 371 may be asserted shortly before a servo, read or write event is to occur. This would allow, for example, power to be applied to inactive circuitry sufficiently in advance to assure that the circuitry is operationally stable (e.g., in time to allow settling transients to resolve) before the particular event begins. Further, such an enable would allow for pad area between events to be reduced. As one particular example, such a setup enable could be used to turn on the power supplies for a write path early enough to allow the internal voltages to settle before any data is actually written out to the disk. As another particular example, such an enable may be used to start the squelch early for servo events. As yet another particular example, such an enable may be used to start the recovered clock turn on sequence ahead of where the clock is needed for read events. Based on the disclosure provided herein, one of ordinary skill in the art will recognize a variety of other possible uses for such a setup enable signal.

By using SAM2SAM count value 307 to assert programmable setup enable signal 371, preparations for a particular event may be started and shut down at accurate intervals. In one particular embodiment of the present invention, decode logic module 330 includes two setup window comparators: one for comparing SAM2SAM count value 307 against a lower threshold available from programmable setup enable register 310, and another for comparing SAM2SAM count value 307 against an upper threshold also available from programmable setup enable register 310. When SAM2SAM count value 307 exceeds the lower threshold, programmable setup enable signal 371 is asserted and continues asserted until SAM2SAM count value 307 exceeds the upper threshold (or in some cases, until an event unrelated to SAM2SAM count value 307 is completed as signaled by a hard disk controller (not shown)). Based on the disclosure provided herein, one of ordinary skill in the art will recognize a variety of circuits that may be used to generate programmable setup enable signal 371 based on the available SAM2SAM count.

Alternatively or in addition, decode logic module 330 provides a programmable start enable signal 372 that is asserted shortly before a start time for a particular function. For example, programmable start enable signal 372 may be asserted shortly before a servo, read or write event is to occur. Such a signal could also be qualified with a conventional gate assertion from a hard disk controller (not shown) so that the controller would still have real time control to suppress or abort an event, however triggering the actual data processing start time of these events with the SAM2SAM counter would allow the pad area between sectors to be reduced and the size of the preamble to be reduced, which means that more disk space could be used for actual data. Based on the disclosure provided herein, one of ordinary skill in the art will recognize a variety of other possible uses for such a setup enable signal.

By using SAM2SAM count value 307 to assert programmable start enable signal 372, timing for starting a particular event may be rendered more accurate. In one particular embodiment of the present invention, decode logic module 330 includes two start window comparators: one for comparing SAM2SAM count value 307 against a lower threshold available from programmable start enable register 315, and another for comparing SAM2SAM count value 307 against an upper threshold also available from programmable start enable register 315. When SAM2SAM count value 307 exceeds the lower threshold, programmable start enable signal 372 is asserted and continues asserted until SAM2SAM count value 307 exceeds the upper threshold (or in some cases, until an event unrelated to SAM2SAM count value 307 is completed as signaled by a hard disk controller (not shown)). Based on the disclosure provided herein, one of ordinary skill in the art will recognize a variety of circuits that may be used to generate programmable start enable signal 372 based on the available SAM2SAM count.

Figure 4:
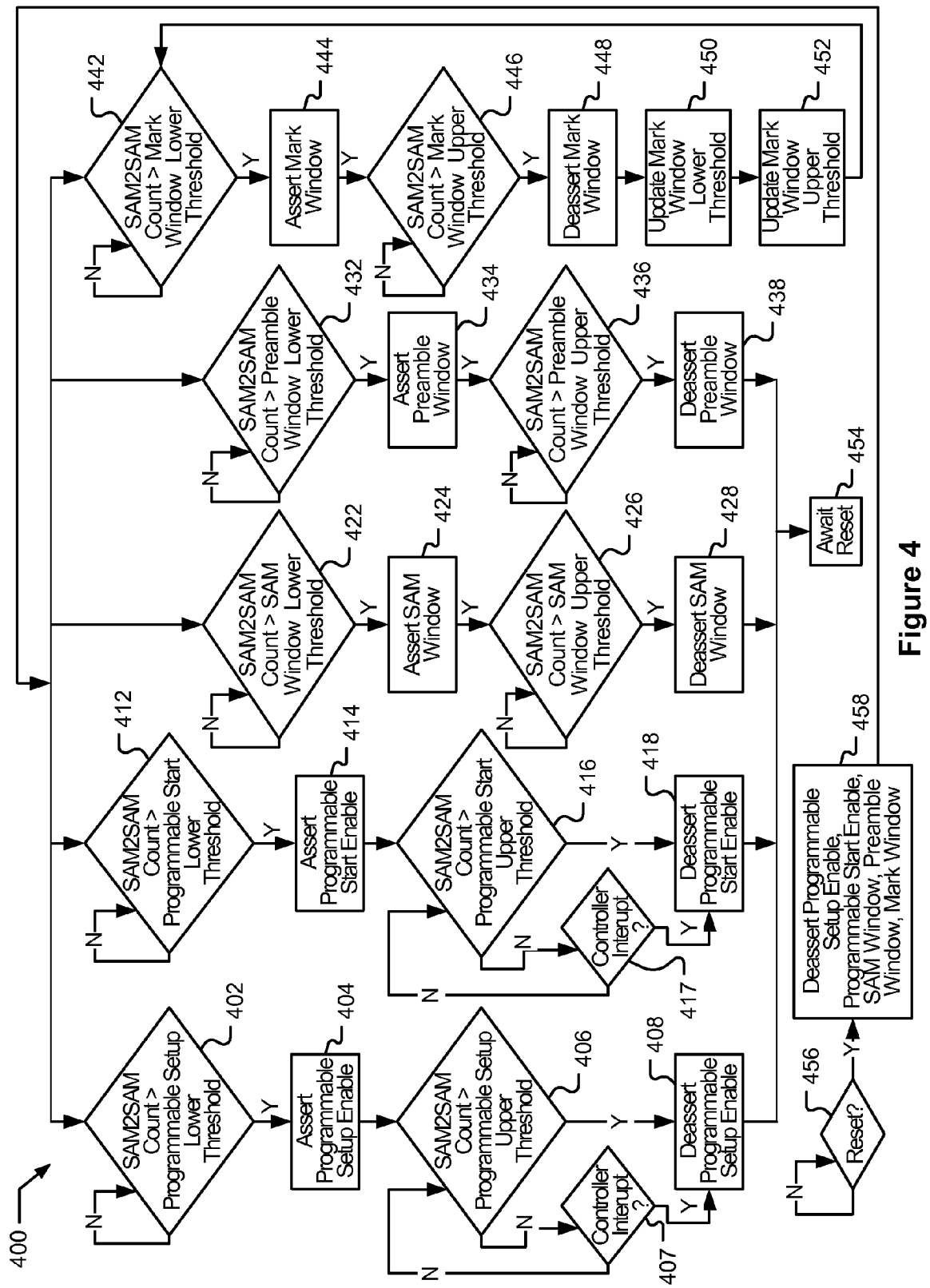
FIG. 4 is a flow diagram showing a process for controlling synchronization in accordance with various embodiments of the present invention.

FIG. 4 is a flow diagram 400 showing a process for synchronization in accordance with various embodiments of the present invention. Following flow diagram 400, the output value of a SAM2SAM counter is compared with a lower threshold associated with a programmable setup output (block 402). Where the lower threshold has been exceeded (block 412), a programmable setup enable is asserted (block 404). Then, it is determined whether an upper threshold associated with the programmable setup output has been exceeded (block 406) or whether an external interrupt from, for example, a hard disk controller has been received (block 407). Where the upper threshold has not yet been exceeded (block 406) and an external interrupt has not been received (block 407), programmable setup enable continues asserted. Alternatively, where the upper threshold has been exceeded (block 406) or where an external interrupt has been received (block 407), programmable setup enable is deasserted (block 408). Once deasserted (block 408), a reset of the SAM2SAM counter is awaited (block 454) before beginning the processes of blocks 402-408 again.

Alternatively or in addition, the output value of a SAM2SAM counter is compared with a lower threshold associated with a programmable start output (block 412). Where the lower threshold has been exceeded (block 412), a programmable start enable is asserted (block 414). Then, it is determined whether an upper threshold associated with the programmable start output has been exceeded (block 416). Where the upper threshold has not yet been exceeded (block 416) or whether an external control signal or interrupt from, for example, a hard disk controller has been received (block 417). Where the upper threshold has not yet been exceeded (block 416) and an external interrupt has not been received (block 417), programmable start enable continues asserted. Alternatively, where the upper threshold has been exceeded (block 416) or where an external interrupt has been received (block 417), programmable start enable is deasserted (block 418). Once deasserted (block 418), a reset of the SAM2SAM counter is awaited (block 454) before beginning the processes of blocks 412-418 again.

Alternatively or in addition, the output value of a SAM2SAM counter is compared with a lower threshold associated with a SAM window output (block 422). Where the lower threshold has been exceeded (block 422), the SAM window output is asserted (block 424). Then, it is determined whether an upper threshold associated with the SAM window output has been exceeded (block 426). Where the upper threshold has not yet been exceeded (block 426), the SAM window output continues asserted. Alternatively, where the upper threshold has been exceeded (block 426), the SAM window output is deasserted (block 428). Once deasserted (block 428), a reset of the SAM2SAM counter is awaited (block 454) before beginning the processes of blocks 422-428 again.

Alternatively or in addition, the output value of a SAM2SAM counter is compared with a lower threshold associated with a preamble window output (block 432). Where the lower threshold has been exceeded (block 432), the SAM window output is asserted (block 434). Then, it is determined whether an upper threshold associated with the SAM window output has been exceeded (block 436). Where the upper threshold has not yet been exceeded (block 436), the SAM window output continues asserted. Alternatively, where the upper threshold has been exceeded (block 436), the SAM window output is deasserted (block 438). Once deasserted (block 438), a reset of the SAM2SAM counter is awaited (block 454) before beginning the processes of blocks 432-438 again.

Alternatively or in addition, the output value of a SAM2SAM counter is compared with a lower threshold associated with a mark window output (block 442). Where the lower threshold has been exceeded (block 442), the mark window output is asserted (block 444). Then, it is determined whether an upper threshold associated with the preamble window output has been exceeded (block 446). Where the upper threshold has not yet been exceeded (block 446), the preamble window output continues asserted. Alternatively, where the upper threshold has been exceeded (block 446), the preamble window output is deasserted (block 448). Once deasserted (block 448), the lower threshold associated with the mark window is increased to indicate the location (e.g., the point where the system should begin looking for the next mark) of the next expected mark (block 450) and the upper threshold associated with the mark window is increased to indicate the location (e.g., the point where the system would expect to have already identify the mark) of the next expected mark (block 452). Using these updated thresholds (blockx 450, 452), the processes of blocks 442-448 are repeated.

The previously described processes continue until the SAM2SAM counter is reset (block 456). Once the SAM2SAM counter is reset (block 456), all of the programmable setup output, the programmable start output, the SAM window output, the preamble window output, and the mark window output are deasserted if they were not already deasserted (block 458). With these signals deasserted, the processes of blocks 402-454 are repeated for the next period between the recently identified SAM and a subsequent SAM.

Figure 5:
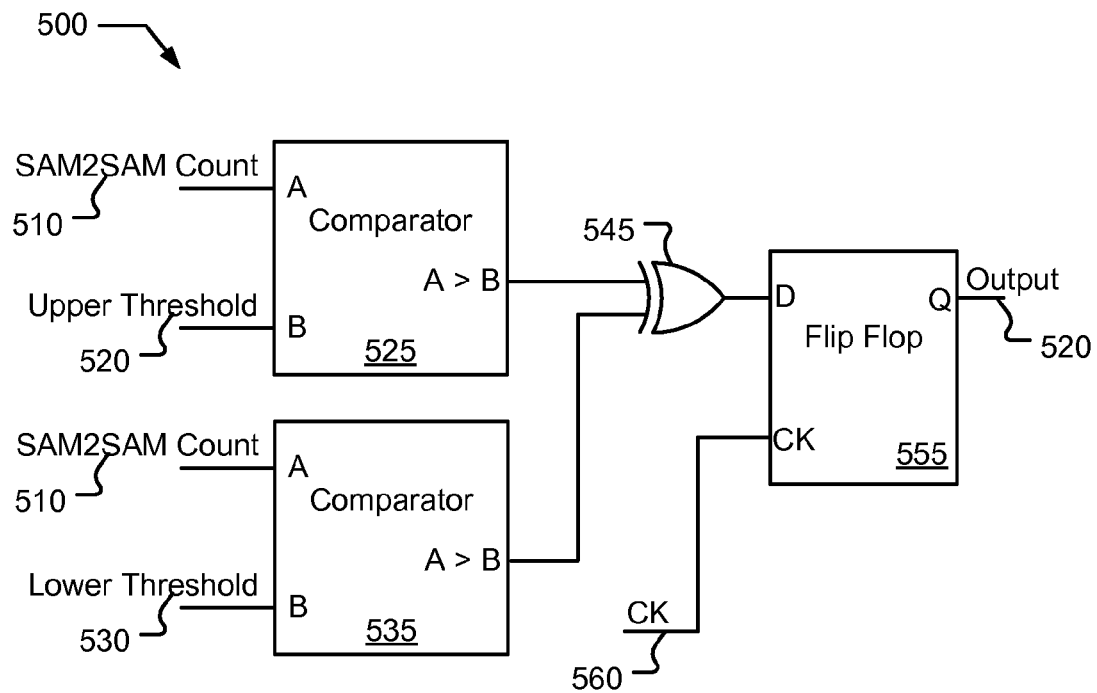
FIG. 5 depicts an exemplary circuit for generating a window output based on a SAM2SAM count value is depicted in accordance with some embodiments of the present invention.

Turning to FIG. 5, an exemplary circuit 500 for generating a window output based on a SAM2SAM count value is depicted in accordance with some embodiments of the present invention. Circuit 500 includes an upper comparator 525 and a lower comparator 535. Upper comparator 525 is operable to compare a SAM2SAM count value 510 (i.e., a value indicating a location between two consecutive servo data sectors) and an upper threshold 520. Upper threshold 520 may be programmable or hard coded. Further, upper threshold 520 may be dynamically modified to allow for detection of, for example, multiple marks occurring between two consecutive servo data sectors. Lower comparator 535 is operable to compare SAM2SAM count value 510 and a lower threshold 530. Lower threshold 530 may be programmable or hard coded. Further, lower threshold 530 may be dynamically modified to allow for detection of, for example, multiple marks occurring between two consecutive servo data sectors. Where upper threshold 520 is greater than SAM2SAM count 510, an output of upper comparator 525 is asserted high.

Where lower threshold 530 is greater than SAM2SAM count 510, an output of lower comparator 535 is asserted high. The output of each of the comparators are provided to an XOR gate 545, and the output of XOR gate 545 is provided to the data input of a flip-flop 555.

In operation, the output of both upper comparator 525 and lower comparator are logic '0's. This results in a logic '0' at the output of XOR gate 545 which is clocked to an output 570 of flip-flop 555 on the next clock 560. This condition remains until SAM2SAM count 510 exceeds lower threshold 530 when the output of lower comparator 535 is asserted as a logic '1'. This results in a logic '1' at the output of XOR gate 545, and ultimately at output 570 of flip-flop 570. This condition continues until SAM2SAM count 510 exceeds upper threshold 520 when the output of upper comparator 525 is asserted as a logic '1'. This results in a logic '0' at the output of XOR gate 545, and ultimately at output 570 of flip-flop 570. This condition remains until SAM2AM count 510 is reset upon identifying a SAM in a subsequent servo data sector.

Figure 6:
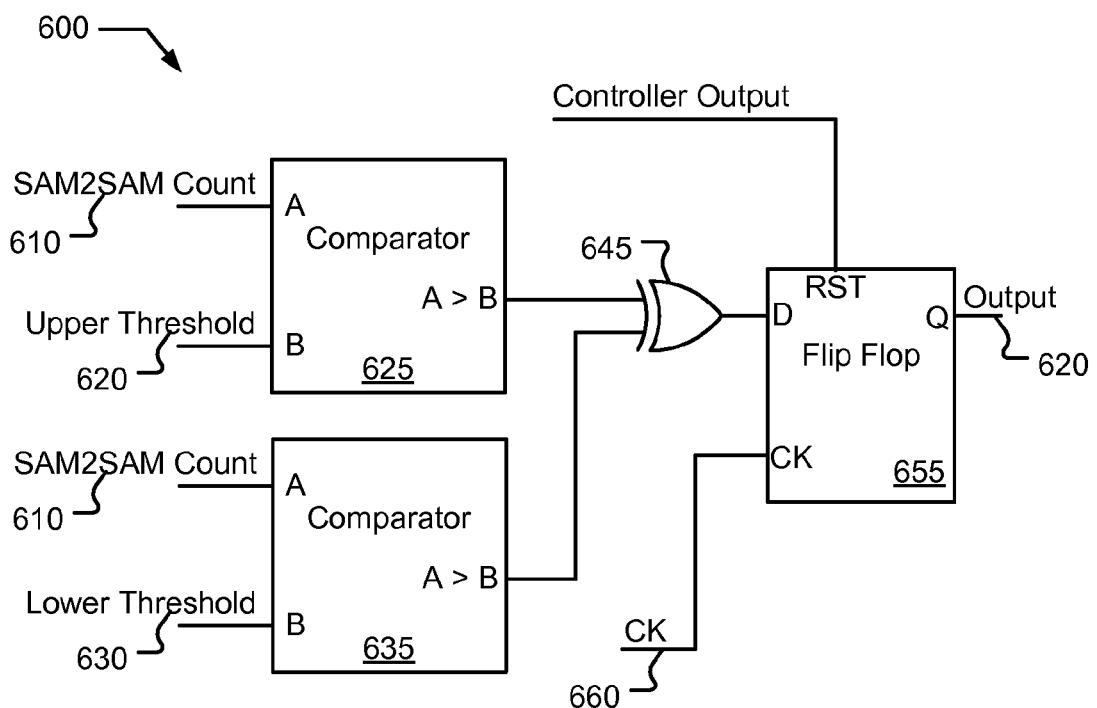
FIG. 6 depicts an exemplary circuit for generating a window output based on a SAM2SAM count value that is controllable by an output from a hard disk controller is depicted in accordance with some embodiments of the present invention.

Turning to FIG. 6, an exemplary circuit 600 for generating a window output based on a SAM2SAM count value that is controllable by an output from a hard disk controller is depicted in accordance with some embodiments of the present invention. Circuit 600 includes an upper comparator 625 and a lower comparator 635. Upper comparator 625 is operable to compare a SAM2SAM count value 610 (i.e., a value indicating a location between two consecutive servo data sectors) and an upper threshold 620. Upper threshold 620 may be programmable or hard coded. Further, upper threshold 620 may be dynamically modified to allow for detection of, for example, multiple marks occurring between two consecutive servo data sectors. Lower comparator 635 is operable to compare SAM2SAM count value 610 and a lower threshold 630. Lower threshold 630 may be programmable or hard coded. Further, lower threshold 630 may be dynamically modified to allow for detection of, for example, multiple marks occurring between two consecutive servo data sectors. Where upper threshold 620 is greater than SAM2SAM count 610, an output of upper comparator 625 is asserted high. Where lower threshold 630 is greater than SAM2SAM count 610, an output of lower comparator 635 is asserted high. The output of each of the comparators are provided to an XOR gate 645, and the output of XOR gate 645 is provided to the data input of a flip-flop 655. A controller output is applied to a reset input of flip-flop 655. This allows a hard disk controller (not shown) to rest output 670 apart from any value of SAM2SAM count 610. Circuit 600 operates substantially the same as circuit 500, except that output 670 may be reset by an input that is not necessarily governed by the value of SAM2SAM count 610. It should be noted that circuits 500 and 600 are merely exemplary and that based on the disclosure provided herein, one of ordinary skill in the art will recognize a variety of circuits that may be used to provide desired outputs based on a SAM2SAMN count value in accordance with various embodiments of the present invention.

In conclusion, the invention provides novel systems, devices, methods and arrangements for controlling access to a magnetic storage medium. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A system for data access, the system comprising:
 a magnetic storage medium, wherein the magnetic storage medium includes at least a first servo data sector and a second servo data sector;
 a mark detection module operable to identify a mark located in one of the second servo data sector, or a user data region between the first servo data sector and the second servo data sector;
 a location counter, wherein the location counter is operable to provide a count value indicating a location between a portion of the first servo data sector and a portion of the second servo data sector; and
 an enable window circuit, wherein the enable window circuit is operable to assert an enable window output based on the count value, wherein the enable window output enables operation of the mark detection module before the mark is expected, and wherein the enable window circuit includes a comparator operable to compare the count value against an upper threshold and a lower threshold, and wherein the enable window output is asserted whenever the count value is greater than the lower threshold and less than the upper threshold.

2. The system of claim 1, wherein the lower threshold is a count value that occurs before a servo address mark is expected, and wherein the upper threshold is a count value that occurs after the servo address mark should have been detected.

3. The system of claim 1, wherein the mark detection module is operable to identify a first mark and a second mark within a user data between the first servo data sector and the second servo data sector, and
 wherein the enable window output enables operation of the mark detection module before the first mark is expected, disables the mark detection module after the first mark should have been detected, and enables the mark detection module before the second mark is expected.

4. The system of claim 1, wherein the system further comprises:
 a preamble detection module, wherein the preamble detection module is operable to identify a preamble within the second servo data sector, and wherein the enable window output enables operation of the preamble detection module when the preamble is expected.

5. The system of claim 1, wherein the enable window circuit is further operable to deassert the enable window output based on an input that is not generated based on the count value.

6. The system of claim 1, wherein at least one of the upper threshold and the lower threshold is programmable.

7. A hard disk drive, wherein the hard disk drive comprises:
 a magnetic storage medium, wherein the magnetic storage medium includes at least a first servo data sector with a first servo address mark and a second servo data sector with a second servo address mark; and
 a disk controller, wherein the disk controller reads data from and writes data to the magnetic storage medium, and wherein the disk controller includes:
  a mark detection module, wherein the mark detection module is operable to identify a first mark and a second mark within a user data between the first servo data sector and the second servo data sector;
  a counter, wherein the counter is operable to provide a count value indicating a location between the first servo address mark and the second servo address mark; and
  an enable window circuit, wherein the enable window circuit is operable to assert an enable window output based on the count value, wherein the enable window circuit is operable to enable operation of a module selected from a group consisting of: a servo address mark detection module operable to identify the second servo address mark within the second servo data sector, a preamble detection module operable to identify a preamble within the second servo data sector, and the mark detection module, and wherein the window output enables operation of the mark detection module before the first mark is expected, disables the mark detection module after the first mark should have been detected, and enables the mark detection module before the second mark is expected.

8. The hard disk drive of claim 7, wherein the all of the servo address mark detection module, the preamble detection module and the mark detection module are included and share at least one circuit element.

9. The hard disk drive of claim 7, wherein the enable window circuit is operable to enable operation of a servo address mark detection module operable to identify the second servo address mark within the second servo data sector.

10. The hard disk drive of claim 7, wherein the enable window circuit is operable to enable operation of a preamble detection module operable to identify a preamble within the second servo data sector.

11. A storage access control circuit, the circuit comprising:
 a mark detection circuit operable to:
  receive an input data set derived from a storage medium, wherein the input data set corresponds to a first data set, a second data set, and a user data set between the first data set and the second data set;
  identify a mark located in at least one of: the user data set, and the second data set;
 a location counter circuit operable to provide a count value indicating a location between a portion of the first data set and a portion of the second data set; and
 an enable window circuit operable to enable operation of the mark detection circuit before the mark is expected, wherein the enable window circuit includes a comparator circuit operable to compare the count value against an upper threshold and a lower threshold, and wherein operation of the mark detection circuit is enabled whenever the count value is between the lower threshold and the upper threshold.

12. The storage control circuit of claim 11, wherein the circuit is implemented as part of a hard disk drive, and wherein the hard disk drive comprises:
 the storage medium that is operable to store a stored data set, wherein the input data set is derived from the stored data set.

13. The storage control circuit of claim 12, wherein the hard disk drive further comprises:
 a processing circuit operable to read the stored data set and to provide the input data set.

14. The storage control circuit of claim 11, wherein the mark is a servo address mark, wherein the lower threshold is a count value that occurs before the servo address mark is expected, and wherein the upper threshold is a count value that occurs after the servo address mark should have been detected.

15. The storage control circuit of claim 11, wherein the mark detection module is operable to identify a first mark and a second mark within the user data set; and
 wherein the enable window output enables operation of the mark detection circuit before the first mark is expected, disables the mark detection circuit after the first mark should have been detected, and enables the mark detection circuit before the second mark is expected.

16. The storage control circuit of claim 11, wherein the circuit further comprises:
    a preamble detection circuit operable to identify a preamble within the second data set, and wherein the enable window circuit is operable to enable operation of the preamble detection module when the preamble is expected.

17. The storage control circuit of claim 11, wherein the enable window circuit is further operable to disable operation of the mark detection circuit based on an input that is not generated based on the count value.

18. The storage control circuit of claim 11, wherein at least one of the upper threshold and the lower threshold is programmable.

19. The storage control circuit of claim 11, wherein the circuit further comprises:
    a preamble detection circuit operable to identify a preamble within the second data set, wherein the enable window circuit is operable to enable operation of the preamble detection circuit when the preamble is expected;
    a servo address mark detection circuit operable to identify a servo address mark within the second data set, wherein the enable window circuit is operable to enable operation of the servo address mark detection circuit when the preamble is expected; and
    wherein the all of the servo address mark detection circuit, the preamble detection circuit and the mark detection circuit share at least one circuit element.

20. The storage control circuit of claim 11, wherein the circuit is implemented as part of a storage device, and wherein the storage device comprises:
    the storage medium that is operable to store a stored data set, wherein the input data set is derived from the stored data set; and
    a processing circuit operable to read the stored data set and to provide the input data set.

* * * * *